(12) United States Patent
Robinson et al.

(10) Patent No.: US 6,181,304 B1
(45) Date of Patent: Jan. 30, 2001

(54) CONVERTIBLE RIGHT EYE/LEFT EYE MONOCULAR HEAD MOUNTED DISPLAY SYSTEM

(75) Inventors: Joel Robinson, Seattle; Wes Williams, Arlington; George W. Cone, Redmond; Dallas Soward, Bothell, all of WA (US)

(73) Assignee: Virtual Vision, Redmond, WA (US)

( * ) Notice: Under 35 U.S.C. 154(b), the term of this patent shall be extended for 0 days.

(21) Appl. No.: 09/132,714

(22) Filed: Aug. 12, 1998

(51) Int. Cl.[7] .................................................. G09G 5/00
(52) U.S. Cl. .................................. 345/8; 345/7; 348/42; 348/43; 348/51; 348/54
(58) Field of Search .................................. 345/8, 7, 9, 10; 348/42, 51, 54, 43, 45, 52, 53

(56) References Cited

U.S. PATENT DOCUMENTS 4,823,080 * 4/1989 Lin ........................................ 324/175
5,815,126 * 9/1998 Fan et al. ................................. 345/8
5,844,656 * 12/1998 Ronzani et al. ...................... 345/158

* cited by examiner

Primary Examiner—Richard A. Hjerpe
Assistant Examiner—Jean Lesperance
(74) Attorney, Agent, or Firm—McAndrews, Held & Malloy, Ltd.

(57) ABSTRACT

A monocular head mounted display system that is convertible between a right eye display system and a left eye display system includes a generally symmetrical frame. A flexible support arm moveably mounted on the frame, supports an image display module. The image display module includes a display and optical system to project an enlarged image at a distance from the user. With the frame in a first position with the image display module below the frame, the image is viewable by a user's right eye. The system is converted by moving the support arm so that the display module is above the frame in the first position and then the frame is flipped over to an inverted position with the display module again below the frame but the image viewable by the user's left eye.

33 Claims, 3 Drawing Sheets

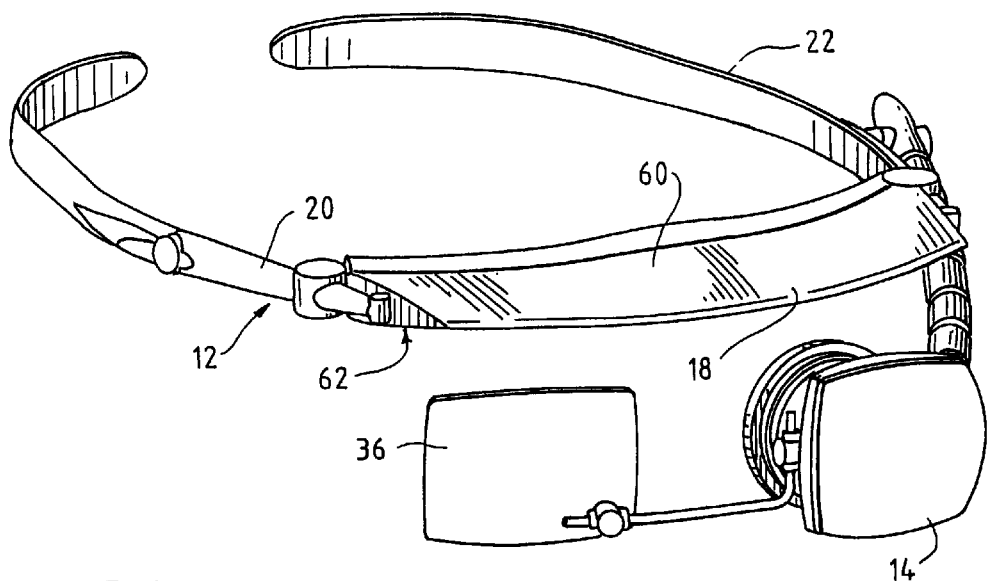
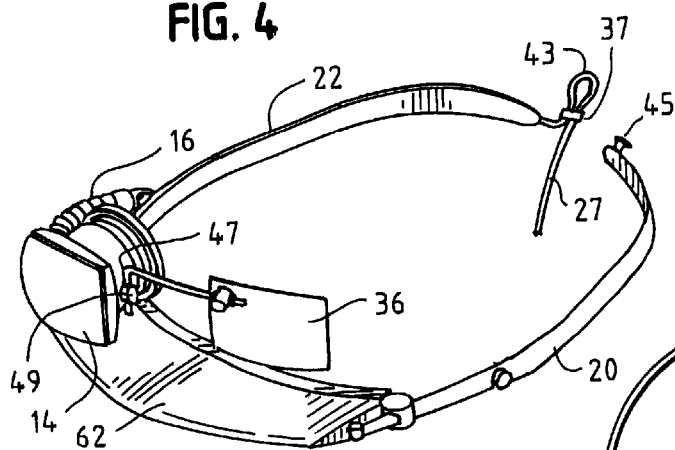
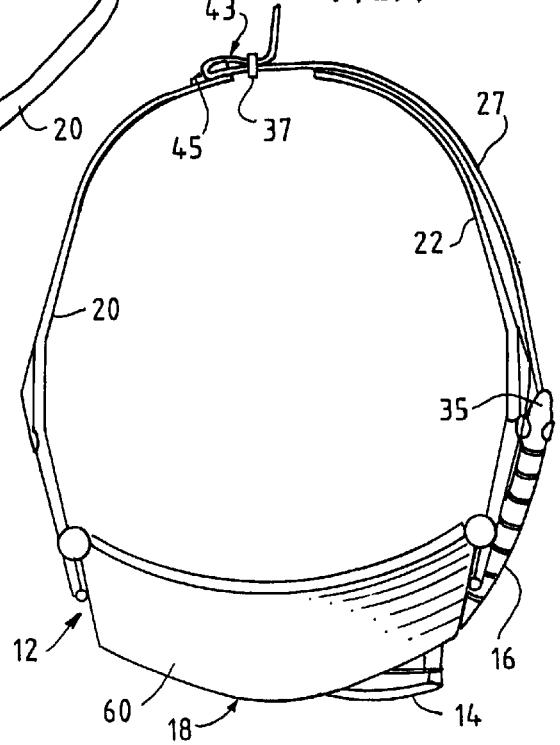

CONVERTIBLE RIGHT EYE/LEFT EYE MONOCULAR HEAD MOUNTED DISPLAY SYSTEM

TECHNICAL FIELD

The present invention relates to a monocular head mounted display system and more particularly to such a system that is convertible for use with either a user's right eye or left eye.

CROSS-REFERENCE TO RELATED APPLICATIONS

N/A

STATEMENT REGARDING FEDERALLY SPONSORED RESEARCH OR DEVELOPMENT

N/A

BACKGROUND OF THE INVENTION

Monocular head mounted display systems are known such as shown in Furness et al. U.S. Pat. No. 5,162,828 and Heacock et al. U.S. Pat. No. 5,539,422. In these systems a display and an associated optical system are mounted on a frame relative to either a user's right eye or left eye so that the user can view, with one eye, an enlarged image that appears at a distance from the user that is greater than the optical path from the display to the user's eye. However, most people are either right eye dominant or left eye dominant. A right dominant person has trouble viewing an image projected only in front of his left eye. Similarly, a left eye dominant person has trouble viewing an image projected only in front of his right eye. As such, a right eye display system is preferable for a right eye dominant person and a left eye display system is preferable for a left eye dominant person. Because the display is typically mounted in a fixed position on the frame relative to a single image viewing eye in known head mounted display systems, one system cannot typically be used by both right eye and left eye dominant users.

BRIEF SUMMARY OF THE INVENTION

In accordance with the present invention, the disadvantages of prior monocular head mounted display systems have been overcome. The monocular head mounted display system of the present invention is easily convertible from a right eye display system to a left eye display system by moving a support for an image display module and flipping the system over. Therefore, one monocular head mounted display system in accordance with the present invention can be used by both right eye dominant and left eye dominant users.

More particularly, the convertible right eye/left eye monocular head mounted display system of the present invention includes a frame that can be worn on a user's head in a first position and, when flipped over, it can be worn in an inverted position. An image display module generates an enlarged image that appears at a distance from the user that is greater than the optical path from the display to the user's eye. A support arm is mounted on the frame for supporting the image display module where the support arm is movable to position the image display module above or below the frame in the first position. When the image display module is positioned below the frame in the first position, the generated image is viewable by one of the user's eyes. When the image display module is positioned above the frame in the first position and the frame is flipped over to the inverted position, the display module is below the frame in the inverted position with the generated image being viewable by the other of the user's eyes.

Depending upon the type of display and optical system employed in the image display module, the module may be controlled to generate one image when the frame is to be worn in the first position and it may be controlled to generate an inverted image when the frame is to be worn in the inverted position so that the image viewed by a right eye user is the same as the image viewed by a left eye user.

In accordance with another feature of the present invention, the frame is generally symmetrical about a horizontal axis so that when the frame is worn in the first position, it appears the same as when the frame is flipped over and worn in the inverted position.

Further, the support arm is preferably flexible along at least a portion of its length to allow the image display module to be moved vertically and horizontally with respect to a user's eye, as well as towards and away from the user's eye. The support arm is, however, rigid enough to maintain the position of the image display module once it is set. This allows the system to easily accommodate different users.

These and other advantages and novel features of the present invention, as well as details of an illustrated embodiment thereof, will be more fully understood from the following description and drawings.

BRIEF DESCRIPTION OF THE SEVERAL VIEWS OF THE DRAWING

FIG. 3 is a front perspective view of the head mounted display system of FIG. 2, flipped over to an inverted position to provide a left eye monocular display system;

FIG. 4 is a top perspective view of the head mounted display system of FIG. 2;

FIG. 5 is a top view of the head mounted display system of FIG. 3; and

DETAILED DESCRIPTION OF THE INVENTION

Figure 1:
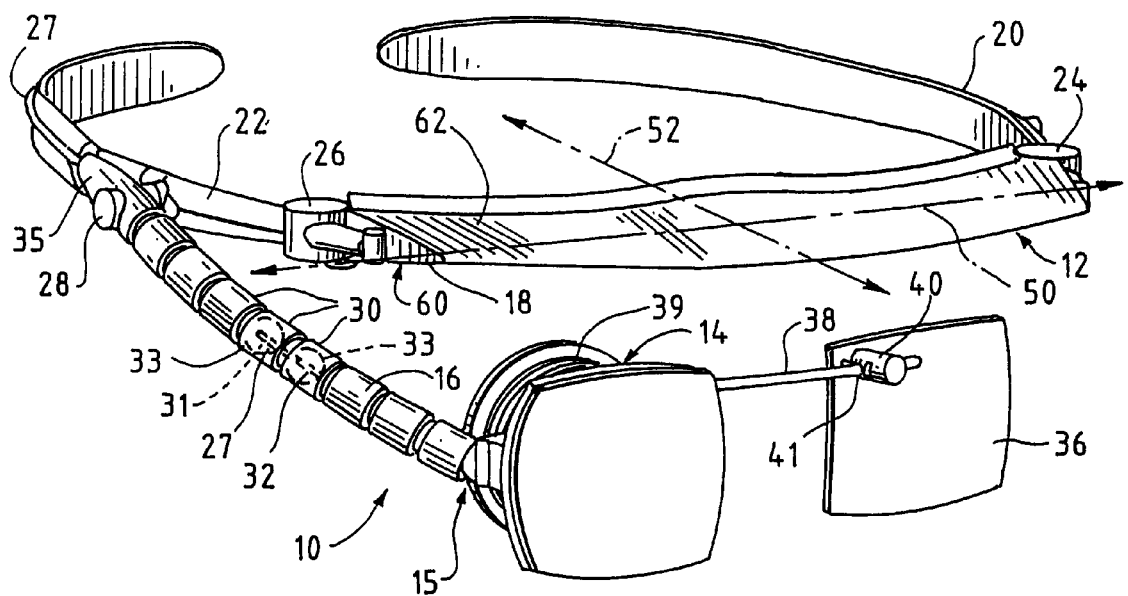
FIG. 1 is a front perspective view of the monocular head mounted display system of the present invention for right eye viewing of an enlarged displayed image.

A convertible right eye/left eye monocular head mounted display system 10 in accordance with the present invention, as shown in FIG. 1, has a frame 12 and an image display module 14 supported on the end 15 of a movable support arm 16. The image display module 14 includes a miniature display or micro-display and an associated optical system to project an enlarged image of the image depicted on the display at a distance from the user that is greater than the optical path from the display to the user's eye.

The frame 12 includes a front portion or visor 18 that extends outwardly from the user's forehead when the system 10 is worn. The visor 18 shades the user's eyes and the display module from overhead light for better viewing of the image. A pair of side portions or temples 20 and 22 extend back from the visor 18 to support the frame 12 on the user's head. The sides 20 and 22 are preferably pivotally connected to the visor 18 by respective connectors 24 and 26 to enable the frame to be folded, in a manner similar to a pair of eyeglasses, when the system 10 is not in use.

The support arm 16 is pivotally mounted via a pivot connector 28 on one side 22 of the frame 12 to allow the image display module to be moved above and below the visor 18 so as to convert the head mounted display system 10 from a right eye monocular display system to a left eye monocular display system as discussed in detail below. The support arm 16 is flexible over at least a portion of the length of the arm 16 to allow the position of the image display module to be adjusted relative to three perpendicular axes to accommodate different users. However, the support arm 16 is sufficiently rigid so as to maintain a position when set.

One suitable configuration of the support arm 16 includes a number of interlocking members 30 wherein each member 30 has a ball 32 at one end and a socket 33 at an opposite end. The members are connected by inserting or snapping the ball 32 of one member into the socket 33 of an adjacent member. The ball and socket connectors, allow each of the members to pivot or rotate with respect to its adjacent member 30. The fit between a ball and socket is fairly tight however so that once the arm is moved into position it remains in that position. This flexibility of the support arm allows the arm to be adjusted so that the image display module 14 can be moved vertically or horizontally with respect to the user's eye and towards and away from the user's eye. This construction of the support arm 16 further allows the image display module 14 to be angled with respect to the user's eye. The flexibility of the support arm 16 enables the head mounted display system 10 to accommodate different users very easily. It is noted, that the interlocking members 30 may be encased in a heat shrinkable cover or tube such as formed of plastic so as to prevent the members 30 from inadvertently being disconnected and to aid in maintaining the position of the support arm 16 when set. However, depending upon the nature of the interlocking members, such a cover may not be necessary.

The interlocking members 30 of the support arm 16 preferably include an aperture 31 that extends centrally therethrough. A cable 27 from the image display module 14 is routed through the apertures 31 in the members 30 along the length of the arm 16 so that the cable 27 exits an end 35 of the arm. As shown in Figures 4 and 5, a grommet 37 can be used to form a loop 43 in the cable 27 wherein the cable 27 passes through an aperture in the grommet 37 twice. The loop 43 can be fastened about a hook 45 or protrusion on the frame side portion 20 opposite the side 22 on which the arm 16 is mounted. This configuration allows the cable 27 to tighten the frame about the user's head so that the frame can be firmly maintained on different sized heads. It further moves the cable 27 towards the rear of the system 10 so that it is less obtrusive to the user. The cable 27 may be connected to a portable controller or the like for the display module.

In order to overcome problems with binocular rivalry, a semi-transparent eye shade 36 is provided for partially occluding the user's view of the real world through the non-image viewing eye. The eye shade 36 is preferably semi-transparent such as a dark sunglass lens so that the user can see through the eye shade 36 but the images viewed therethrough are suppressed by being substantially darkened or shaded. The size of the eye shade 36 is preferably approximately the size of the display module 14 when viewed from the front so as to provide a balanced appearance. The eye shade 36 is, however, preferably small enough to maintain the user's peripheral vision unobstructed. It is noted, that the size of the eye shade 36 may be reduced to obscure only a portion of the user's central field of view from the non-image viewing eye and still overcome binocular rivalry. Further, if desired, the eye shade 36 may be totally occluding. In order to accommodate users with different interpupillary distances, the eye shield 36 is movably mounted with respect to the image display module 14. More particularly, a small arm or rod 38 has a flange 47 at one end that extends perpendicular to the rod 38. The flange 47 extends through an aperture in a connector 49 to mount the rod 38 on a housing 39 of the display module 14. The rod 38 extends laterally outward from the display module 14 and through an aperture 41 in a connector 40 mounted on the eye shade 36. The rod 38 is preferably movable within the aperture 41 of the connector to allow positioning of the eye shade 36 closer to the image display module 14 or farther therefrom so as to accommodate different interpupillary distances. The flange 47 of the rod is further preferably moveable within the connector 49 so that the eye shade can be vertically adjusted as well.

The frame 12 of the present invention is generally symmetrical about a horizontal axis 50 that extends through the center of the visor 18 from the right side thereof to the left side thereof. The symmetry allows the frame 12 to appear visually the same when worn in a first position as shown in FIG. 1 as when the frame 12 is flipped over into an inverted position and worn to provide a left eye monocular display as depicted in FIG. 3. Therefore, the bottom of the frame 60 and in particular the visor 18 appears the same as the top 62 of the frame and/or visor 18. Although the frame 12 is generally symmetrical, it need not be completely symmetrical. For example, in a preferred embodiment, the temples or sides 20 and 22 of the frame are slightly vertically offset so that when the temples 20 and 22 are folded, they do not interfere with each other.

Figure 2:
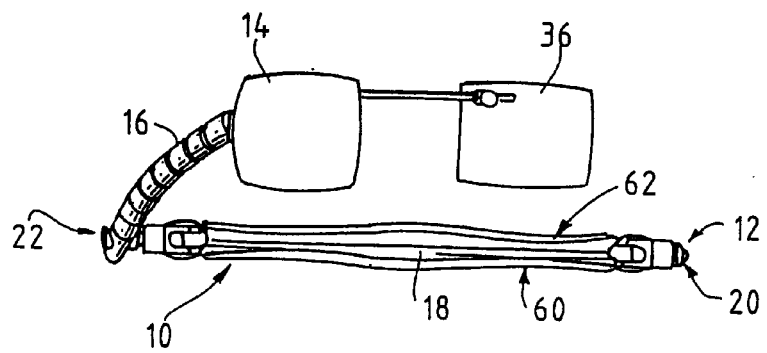
FIG. 2 is a front view of the head mounted display system with a frame positioned as in FIG. 1 but with a support arm moved so that an image display module is positioned above the frame.

In order to convert the head mounted display system 10 from a right eye monocular display as depicted in FIG. 1 into a left eye monocular display, the support arm 16 is moved from a position where the image display module 14 is positioned below the front portion or visor 18 of the frame 12 to a position where the image display module 14 is above the visor 18 with the frame 12 in a non-inverted position as shown in FIG. 2. Thereafter, the frame 12 is flipped over by rotating the frame 180° about an axis 52 that extends in a direction generally perpendicular to the length of the visor 18 and the axis 50 and in a direction, generally parallel to at least a portion of the sides 20 and 22 of the frame 12. When the frame 12 is thus flipped over into an inverted position, the image display module 14 is positioned below the visor 18 with the image generated by the image display module 14 being viewable by the user's left eye. In the inverted position, the top of the visor 62 is facing downwards whereas the bottom of the visor 60 is facing upward. It should be appreciated, that the head mounted display system 10 can be converted from a right eye monocular display system to a left eye monocular display system by first flipping over the frame 12 and then moving the support arm 16 so as to position the image display module 14 on the opposite side of the visor 18. Further, although the left eye monocular display is described as having the frame in an inverted position, it can also be considered the first position in which case the frame for the right eye display would be in the inverted position.

A suitable image display module 14 may include a miniature or micro-display 72 that is viewed by one of the user's eyes 70 through an aspheric lens 74. The aspheric lens 74 may be such as described in U.S. Pat. No. 5,543,816 entitled Head Mounted Display System With Aspheric Optics. The aspheric lens 74 may include a defractive corrector on a surface 76, a surface 78 or on both surfaces so as to correct for chromatic aberrations in the display system. Further, if desired, another corrective optic may be interposed between the display 72 and the aspheric lens 74. It should be appreciated, however, that other types of image display modules may be utilized in accordance with the present invention as well. For example, the display 72 may be mounted in the housing 39 of the module 14 in a position perpendicular to the position of the display 72 shown in FIG. 6 wherein a reflector or partial reflector is used to reflect the image from the display into the user's eye 70 as will be apparent to one of ordinary skill in the art.

Figure 6:
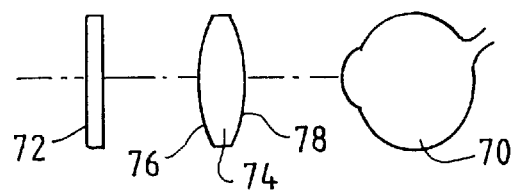
FIG. 6 is a side view of the display and associated optical system of the image display module depicted in relation to a user's eye.
Figure 7:
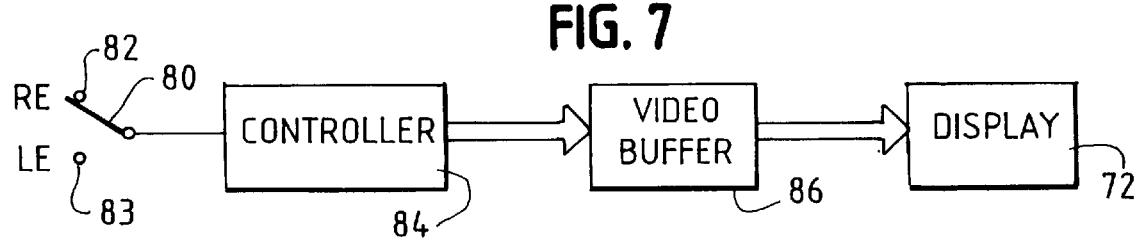
FIG. 7 is a block diagram of an image display controller for generating an image for viewing when the frame is to be worn in one position and for generating an inverted image for viewing when the frame is to be worn in an inverted position.

It is noted that, with the image display module depicted in FIG. 6, when the head mounted display system 10 is converted as described above from a right eye image display to a left eye image display, the portion of the image that appeared in the upper left of the display prior to the conversion will appear in the lower right of the display after the conversion; and the portion of the image in the lower right of the display before the conversion will appear in the upper left of the display after the conversion. Similarly, the portion of the image depicted in the lower left of the display before the conversion will appear in the upper right of the display after the conversion and the portion of the image that appeared in the upper right of the display before the conversion will appear in the lower left of the display after the conversion. The image will thus appear upside down and right-left, reversed after the conversion if the image is not inverted on the display 72.

In order to invert the image depicted on the display 72 so that it appears to be the same when viewed via the right eye monocular display configuration of the system 10 and when viewed by the user's left eye in the left eye monocular configuration as depicted in FIG. 3, the system 10 includes a controller 84 for inverting the image on the display 72 when the frame is to be worn in the inverted position. A switch 80 mounted on the frame 12, module 14 or controller 84 is moveable between right eye and left eye positions 82 and 83 respectively. When the switch 80 is in the right eye position 82, the controller 84, which may include a microprocessor or the like, writes image data to be depicted on the display 72 into a video buffer 86 in a left to right and top to bottom manner or order so as to provide a bit mapped image of the image to be depicted on the display 72. With the switch 80 in the position 82, the controller reads the data out from the image buffer in the same maimer in which the data was written into the buffer. When the switch 80 is moved to the left eye position 83, the controller 84 is responsive to the selection of the left eye monocular display position so as to invert the image either upon writing the image data into the buffer 86 or upon reading the image data out of the buffer 86 to the display 72. More particularly, if the image data is to be inverted upon writing the data into the buffer 86, the controller stores the data in a manner opposite to the storage of the data when the switch 80 is in the right eye position 82 so that the data is written into the buffer 86, for example, from right to left and bottom to top. In this embodiment, the data is read out of the video buffer from left to right and top to bottom in the same manner as the data is read out to the display 72 with the switch 80 in position 82. The image depicted on the display 72 is thereby inverted when the switch 80 is in the left eye position 83 from the image depicted on the display 72 when the switch 80 is in the right eye position 82 so that it appears the same when viewed with the system in the right eye or left eye position. Alternatively, the controller 84 may be responsive to the switch 80 in the left eye position 83 by writing the image data into the video buffer 86 in the same manner as the data is written into the buffer when the switch 80 is in the right eye position 82. However, in this embodiment, the data in the image buffer 86 is read out to the display 72 in the opposite manner when the switch 80 is in the left eye position 83 from the manner in which the data is read out when the switch 80 is in the right eye position 82. Specifically, the data would be read out from the video buffer 86 in this embodiment with the switch 80 in the left eye position 83 from right to left and bottom to top.

The head mounted display system 10 of the present invention is easily convertible between a right eye monocular display system and a left eye monocular display system by merely moving the support arm 16 to reposition the image display module 14 on an opposite side of the visor 18, thereafter flipping over the frame 12 and if necessary, depending on the image display module 14, actuating a switch 80 so as to provide an inverted image on the display 72. This conversion is accomplished without removing and/or replacing any of the components of the head mounted display system 10. Because the head mounted display system 10 can be used by both right eye dominant and left eye dominant users, the system 10 is extremely flexible. Further, since only one head mounted display system can accommodate both types of users, manufacturing costs and inventory costs are substantially reduced.

Many modifications and variations of the present invention are possible in light of the above teachings. Thus, it is to be understood that, within the scope of the appended claims, the invention may be practiced otherwise than as described hereinabove.

What is claimed and desired to be secured by Letters Patent is:

1. A monocular head mounted display system convertible from a right eye display to a left eye display comprising:
   a frame to be worn on a user's head in a first position and, when flipped over, to be worn in an inverted position;
   an image display module for generating an image;
   a support arm mounted on the frame for supporting the image display module, the support arm being moveable to position the image display module above or below the frame in the first position so that when the image display module is positioned below the frame in the first position the generated image is viewable by one of the user's eyes and when the image display module is positioned above the frame in the first position and the frame is flipped over to the inverted position, the display module is below the frame in the inverted position with the generated image being viewable by the other of the user's eyes.

2. A monocular head mounted display system convertible from a right eye display to a left eye display as recited in claim 1 wherein said frame is generally symmetrical about a horizontal axis so that when the frame is worn in the first position it appears the same as when the frame is flipped over to the inverted position.

3. A monocular head mounted display system convertible from a right eye display to a left eye display as recited in claim 1 wherein said support arm is adjustable to allow the image display module to be moved vertically with respect to a user's eye, horizontally with respect to the user's eye and towards and away from the user's eye.

4. A monocular head mounted display system convertible from a right eye display to a left eye display as recited in claim 1 wherein said support arm is flexible over at least a portion of the length of the arm to allow the position of the image display module to be adjusted relative to three perpendicular axes to accommodate different users but the support arm is sufficiently rigid so as to maintain a position when set.

5. A monocular head mounted display system convertible from a right eye display to a left eye display as recited in claim 4 wherein said support arm includes a plurality of interlocking members having ball and socket connectors with a heat shrinkable cover thereover.

6. A monocular head mounted display system convertible from a right eye display to a left eye display as recited in claim 1 wherein said image display module includes a display, the display being coupled to an image buffer that stores data representing an image or an inverted image for display depending upon whether the frame is to be worn in the first position or in the inverted position.

7. A monocular head mounted display system convertible from a right eye display to a left eye display as recited in claim 1 wherein said image display module includes a display, the display being coupled to an image buffer that stores data representing an image, the image data being read out from said image buffer in one order for a frame in the first position and the image data being read out from said image buffer in an opposite order for a frame in the inverted position.

8. A monocular head mounted display system convertible from a right eye display to a left eye display as recited in claim 1 including a semi-transparent eye shade mounted on said image display module so as to be positioned in at least a portion of the user's central field of view of the non-image viewing eye.

9. A monocular head mounted display system convertible from a right eye display to a left eye display as recited in claim 8 wherein said eye shade is adjustably mounted on said display module so as to accommodate different interpupillary distances.

10. A monocular head mounted display system convertible from a right eye display to a left eye display comprising:
 a frame to be worn on a user's head in a first position and, when flipped over, to be worn in an inverted position;
 an image display module for generating an image viewable by a user, said module having a display for depicting an image thereon and an optical system for enlarging the displayed image for viewing;
 a support arm mounted on the frame for supporting the image display module, the support arm being moveable to position the image display module above or below the frame when in the first position so that when the display module is positioned below the frame in the first position, the generated image is viewable by one of the user's eyes and when the image display module is positioned above the frame in the first position and the frame is thereafter flipped over to the inverted position, the display module is below the frame in the inverted position with the generated image being viewable by the other of the user's eyes; and
 a controller for inverting the displayed image when the frame is in the inverted position so that the image viewed by the one eye with the frame in the first position appears the same as the inverted image when viewed by the other eye with the frame in the inverted position.

11. A monocular head mounted display system convertible from a right eye display to a left eye display as recited in claim 10 wherein said frame is generally symmetrical about a horizontal axis so that when the frame is worn in the first position it appears the same as when the frame is flipped over to the inverted position.

12. A monocular head mounted display system convertible from a right eye display to a left eye display as recited in claim 10 wherein said support arm is adjustable to allow the image display module to be moved vertically with respect to a user's eyes horizontally with respect to the user's eye and towards and away from the user's eye.

13. A monocular head mounted display system convertible from a right eye display to a left eye display as recited in claim 10 wherein said support arm is flexible over at least a portion of the length of the arm to allow the position of the image display module to be adjusted relative to three perpendicular axes to accommodate different users but the support arm is sufficiently rigid so as to maintain a position when set.

14. A monocular head mounted display system convertible from a right eye display to a left eye display as recited in claim 13 wherein said support arm includes a plurality of interlocking members having ball and socket connectors with a heat shrinkable cover thereover.

15. A monocular head mounted display system convertible from a right eye display to a left eye display as recited in claim 10 wherein said image display module includes a display, the display being coupled to an image buffer that stores data representing an image or an inverted image for display depending upon whether the frame is to be worn in the first position or in the inverted position.

16. A monocular head mounted display system convertible from a right eye display to a left eye display as recited in claim 10 wherein said image display module includes a display, the display being coupled to an image buffer that stores data representing an image, the image data being read out from said image buffer in one order for a frame in the first position and the image data being read out from said image buffer in an opposite order for a frame in the inverted position.

17. A monocular head mounted display system convertible from a right eye display to a left eye display as recited in claim 10 including a semi-transparent eye shade mounted on said image display module so as to be positioned in at least a portion of the user's central field of view of the non-image viewing eye.

18. A monocular head mounted display system convertible from a right eye display to a left eye display as recited in claim 17 wherein said eye shade is adjustably mounted on said display module so as to accommodate different interpupillary distances.

19. A monocular head mounted display system convertible from a right eye display to a left eye display comprising:
 a frame to be worn on a user's head having a front portion that extends outwardly from a user and a pair of side portions, the frame being generally symmetrical so as to appear the same when worn in a first position and when flipped over and worn in an inverted position;
 an image display module for generating an image viewable by a user wherein the image is invertible; and
 a support arm mounted on the frame for supporting the image display module, the support arm being moveable to position the image display module above or below the front position of the frame in the first position so that when the image display module is positioned below the front portion of the frame in the first position, the generated image is viewable by one of the user's eyes and when the image display module is positioned above the front portion of the frame in the first position and the frame is thereafter flipped over to the inverted position, the generated image is viewable by the other of the user's eyes.

20. A monocular head mounted display system convertible from a right eye display to a left eye display as recited in claim 19 wherein said side portions of the frame are pivotally connected to the front portion of the frame so that the frame can be folded.

21. A monocular head mounted display system convertible from a right eye display to a left eye display as recited in claim 19 wherein said support arm is adjustable to allow the image display module to be moved vertically with respect to a user's eye, horizontally with respect to the user's eye and towards and away from the user's eye.

22. A monocular head mounted display system convertible from a right eye display to a left eye display as recited in claim 19 wherein said support arm is flexible over at least a portion of the length of the arm to allow the position of the image display module to be adjusted relative to three perpendicular axes to accommodate different users but the support arm is sufficiently rigid so as to maintain a position when set.

23. A monocular head mounted display system convertible from a right eye display to a left eye display as recited in claim 22 wherein said support arm includes a plurality of interlocking members having ball and socket connectors with a heat shrinkable cover thereover.

24. A monocular head mounted display system convertible from a right eye display to a left eye display as recited in claim 19 wherein said image display module includes a display, the display being coupled to an image buffer that stores data representing an image or an inverted image for display depending upon whether the frame is to be worn in the first position or in the inverted position.

25. A monocular head mounted display system convertible from a right eye display to a left eye display as recited in claim 19 wherein said image display module includes a display, the display being coupled to an image buffer that stores data representing an image, the image data being read out from said image buffer in one order for a frame in the first position and the image data being read out from said image buffer in an opposite order for a frame in the inverted position.

26. A monocular head mounted display system convertible from a right eye display to a left eye display as recited in claim 19 including a semi-transparent eye shade mounted on said image display module so as to be positioned in at least a portion of the user's central field of view of the non-image viewing eye.

27. A monocular head mounted display system convertible from a right eye display to a left eye display as recited in claim 26 wherein said eye shade is adjustably mounted on said display module so as to accommodate different interpupillary distances.

28. A monocular head mounted display system convertible from a right eye display to a left eye display comprising:
 a frame to be worn on a user's head in a first position and, when flipped over, to be worn in an inverted position;
 an image display module for generating an image;
 a support arm mounted on the frame for supporting the image display module, the support arm being moveable to position the image display module above or below the frame in the first position so that when the image display module is positioned below the frame in the first position the generated image is viewable by one of the user's eyes and when the image display module is positioned above the frame in the first position and the frame is flipped over to the inverted position, the display module is below the frame in the inverted position with the generated image being viewable by the other of the user's eyes, said support arm being flexible over at least a portion of its length but capable of substantially maintaining a given position once set so as to allow a user to adjust the position of the image display module relative to the image viewing eye.

29. A monocular head mounted display system convertible from a right eye display to a left eye display as recited in claim 28 wherein said support arm includes an aperture extending through at least a portion of the length of the arm and through which a cable from said image display module extends.

30. A monocular head mounted display system convertible from a right eye display to a left eye display as recited in claim 29 wherein said frame includes a protrusion on a side of the frame opposite to a side of the frame on which the arm is mounted so as to be able to engage a loop formed in the cable.

31. A monocular head mounted display system convertible from a right eye display to a left eye display as recited in claim 29 wherein the loop in the cable is adjustable to different positions along the length of the cable.

32. A monocular head mounted display system convertible from a right eye display to a left eye display comprising:
 a frame to be worn on a user's head in a first position and, when flipped over, to be worn in an inverted position;
 an image display module for generating an image;
 a support arm mounted on the frame for supporting the image display module, the support arm being moveable to position the image display module above or below the frame in the first position so that when the image display module is positioned below the frame in the first position the generated image is viewable by one of the user's eyes and when the image display module is positioned above the frame in the first position and the frame is flipped over to the inverted position, the display module is below the frame in the inverted position with the generated image being viewable by the other of the user's eyes, said support arm being flexible over at least a portion of its length but capable of substantially maintaining a given position once set so as to allow a user to adjust the position of the image display module relative to the image viewing eye and said support arm having an aperture extending through at least a portion of the length of the arm and through which a cable from said image display module extends, said cable being used to provide signals to control the display module and the cable being used to tighten the frame about the user's head.

33. A monocular head mounted display system convertible from a right eye display to a left eye display as recited in claim 32 wherein said cable exits the support arm adjacent to one side of the frame and engages a member attached to an opposite side of the frame to tighten the frame about the user's head.

* * * * *